May 21, 1946.  M. G. HASSEL  2,400,642
STRAINER ATTACHMENT
Filed Nov. 20, 1944

Inventor
Manley G. Hassel,

Patented May 21, 1946

2,400,642

UNITED STATES PATENT OFFICE 2,400,642

STRAINER ATTACHMENT

Manley G. Hassel, Nevada City, Calif.

Application November 20, 1944, Serial No. 564,368

1 Claim. (Cl. 210—163.5)

This invention appertains to new and useful improvements in strainer attachments for receptacles such as pots, buckets and the like.

The principal object of the present invention is to provide a strainer attachment which may be applied to pots and buckets of different sizes.

Another important object of the invention is to provide a strainer attachment for receptacles which can be conveniently held in place on a receptacle as the receptacle is being tilted and the contents strained through the same.

Various other objects and advantages of the invention shall become apparent to the reader of the following description.

Figure 1:
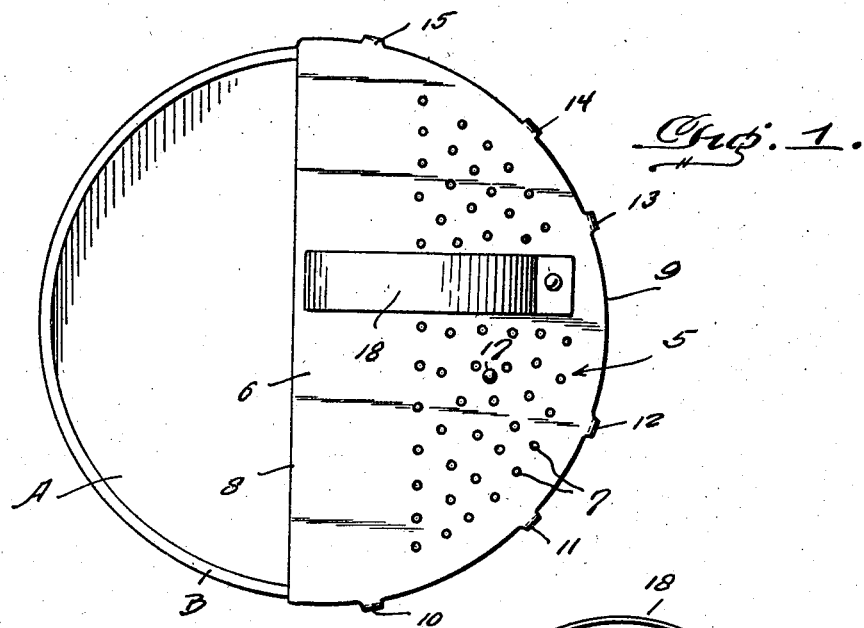
Figure 1 is a top plan view showing a receptacle with the strainer applied.
Figure 2:
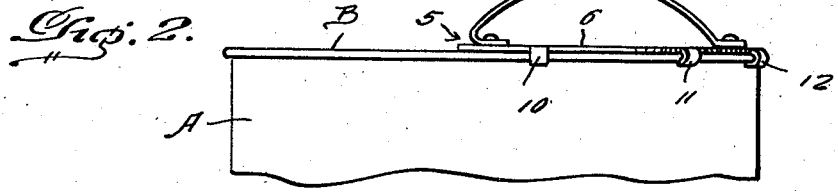
Figure 2 is a fragmentary side elevational view of the strainer applied to a receptacle.

Referring to the drawing wherein like numerals designate like parts, it can be seen that reference character A denotes a receptacle such as a pot having a rolled upper edge or outstanding lip B. Most receptacles have such edge portion and it is with this conventional edge portion construction that the present invention is particularly applicable.

Figure 3:
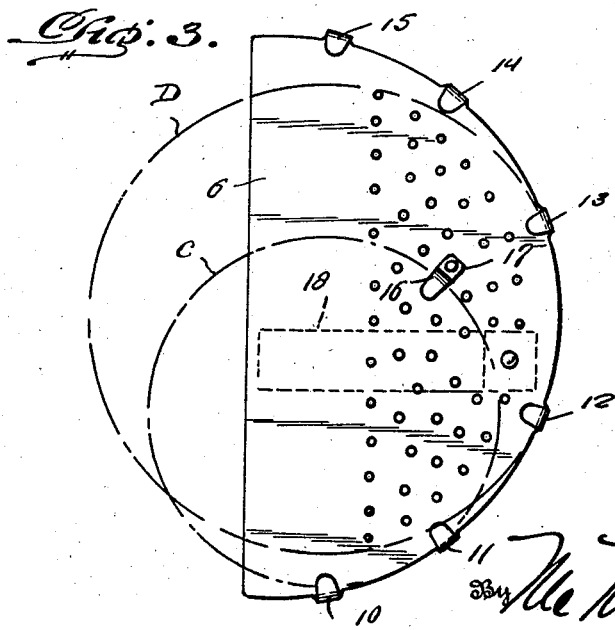
Figure 3 is a bottom plan view of the strainer showing in broken circles, the receptacle diameters that the attachment is capable of accommodating.

Numeral 5 generally refers to the present invention which consists of a semi-circular plate 6 having a multiplicity of the desired size openings 7 formed therethrough. The plate 6 has a straight edge 8 and an arcuate or semi-circular curved edge 9 and along this edge 9 are clips or hooks 10, 11, 12, 13, 14 and 15, these hooks being bent downwardly and under the edge portion 9 of the plate 6, as in the manner shown in Figure 3. A clip 16 is secured by a rivet or the like 17 to an intermediate portion of the plate 6 for accommodating small size pots.

Assuming that the plate 6 is of a definite size and the hooks 10 to 15 and the clip 16 have been arranged according to calculations in view of the range of receptacle sizes the attachment is adapted to accommodate. With this prearrangement of the hooks 10 to 15 and the clip 16, the hooks 10 and 11 and the clip 16 will be employed in handling pots and other receptacles of the diameter C, while the hooks 10, 11, 12 and 13 would be employed in accommodating receptacles of the diameter D. For a larger size receptacle all of the hook members 10 to 15, inclusive, would be employed.

The hooks 10 to 15, inclusive, and the clip 16 are so formed as to snugly engage under the rim B of the receptacle A and on the top side of the plate 6 is a handle 18 which can be held by the left hand as a receptacle A is tilted to pour its contents through the opening of the plate 6, it being apparent that the hooks 10 to 15 will serve to support the top of the pot or receptacle during the pouring operation.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

In combination, a receptacle having an outstanding rim portion, a perforated plate of semi-circular form and having a straight edge of a length greater than the diameter of the receptacle when placed thereon, said plate having projections at its curved edge adapted to embrace the rim portion of the receptacle, an upstanding handle on the plate adapted to be held while the receptacle is supported by the projections when in pouring position, and a clip on the under side of the plate positioned inwardly of its curved edge and cooperating with one or more of said projections for engaging the rim of a receptacle of predetermined size.

MANLEY G. HASSEL.